US012438260B1

(12) United States Patent
Smolyaninov et al.

(10) Patent No.: US 12,438,260 B1
(45) Date of Patent: Oct. 7, 2025

(54) SURFACE ELECTROMAGNETIC WAVE ANTENNA

(71) Applicant: Saltenna Inc., McLean, VA (US)

(72) Inventors: Igor Smolyaninov, Columbia, MD (US); Quirino Balzano, Annapolis, MD (US)

(73) Assignee: Saltenna Inc., McLean, VA (US)

( * ) Notice: Subject to any disclaimer, the term of this patent is extended or adjusted under 35 U.S.C. 154(b) by 0 days.

(21) Appl. No.: 19/112,099

(22) PCT Filed: Dec. 20, 2024

(86) PCT No.: PCT/US2024/061379
§ 371 (c)(1),
(2) Date: Mar. 14, 2025

(51) Int. Cl.
*H01Q 1/36* (2006.01)
*H01Q 1/50* (2006.01)

(52) U.S. Cl.
CPC ............... *H01Q 1/362* (2013.01); *H01Q 1/50* (2013.01)

(58) Field of Classification Search
CPC ................................ H01Q 1/362; H01Q 1/50
See application file for complete search history.

(56) References Cited

U.S. PATENT DOCUMENTS 3,491,291 A 1/1970 Walker
3,573,840 A * 4/1971 Gouillou .................. H01Q 1/38 343/843

(Continued)

FOREIGN PATENT DOCUMENTS

CN 108933326 A * 12/2018 ........... H01Q 21/065
CN 109361072 A * 2/2019 ............... H01Q 1/36

OTHER PUBLICATIONS

Dvor Etckaia et al. "Effect of metallic nanoantennas on the efficiency of the surface plasmon-polariton generation via excitation of electromagnetic waves in a tunnel junction." Journal of Physics: Conference Series. vol. 1124. No. 7. IOP Publishing, 2018. Retrieved on Feb. 10, 2025 (Feb. 10, 2025) from <https://iopscience.iop.org/article/10.1088/1742-6596/II 24/7 /071023/pdf(5 pgs).

(Continued)

*Primary Examiner* — Dimary S Lopez Cruz
*Assistant Examiner* — Bamidele A Immanuel
(74) *Attorney, Agent, or Firm* — Esplin & Associates, PC

(57) ABSTRACT

Surface electromagnetic wave (SEW) antennas for maintaining resonance frequency in response to proximity to a conducting surface and related methods are described. In some implementations, an SEW antenna may include a tip with a spherical particle configured to maintain the antenna's resonance frequency when in proximity to a conductive surface. The antenna may feature a resonant helix that supports a strong electric field at the tip and a strong magnetic field within its core, facilitating efficient energy transfer to surface plasmon polaritons. The antenna may comprise one or more feed points located on the resonant helix, with each feed point corresponding to a specific operating frequency band, enabling the antenna to support multiband operation. This configuration may allow for enhanced bandwidth and reduced antenna dimensions, overcoming the Chu-Harrington limit and enabling compact design for applications where space is at a premium. Dimensions may be reduced through loading of the helix.

20 Claims, 8 Drawing Sheets

(56) References Cited

U.S. PATENT DOCUMENTS

| | | | | |
|---|---|---|---|---|
| 5,191,352 | A * | 3/1993 | Branson | H01Q 1/362 343/895 |
| 5,329,287 | A * | 7/1994 | Strickland | H01Q 11/08 343/895 |
| 6,011,524 | A | 1/2000 | Jervis | |
| 7,609,226 | B1 * | 10/2009 | MacGahan | H01Q 11/08 343/846 |
| 9,373,895 | B1 | 6/2016 | Langfield | |
| 9,431,705 | B2 * | 8/2016 | Basirat | H01Q 9/42 |
| 10,374,299 | B1 * | 8/2019 | Marshall | H01Q 1/362 |
| 10,892,545 | B1 * | 1/2021 | Parsche | H01Q 1/12 |
| 11,108,436 | B1 * | 8/2021 | Kerselaers | H04B 5/26 |
| 2002/0041256 | A1 * | 4/2002 | Saitou | H01Q 9/30 343/702 |
| 2003/0058186 | A1 | 3/2003 | Saito | |
| 2004/0017318 | A1 * | 1/2004 | Annabi | H01Q 1/36 343/702 |
| 2004/0201531 | A1 * | 10/2004 | Fujimura | H01Q 1/362 343/895 |
| 2004/0257298 | A1 | 12/2004 | Larouche | |
| 2008/0106485 | A1 * | 5/2008 | Huang | H01Q 1/242 343/895 |
| 2008/0129511 | A1 * | 6/2008 | Yuen | H01Q 1/2216 340/572.7 |
| 2008/0153416 | A1 * | 6/2008 | Washiro | H01P 3/16 455/41.1 |
| 2010/0060539 | A1 * | 3/2010 | Suetsuna | H01Q 9/42 427/127 |
| 2010/0231464 | A1 * | 9/2010 | Huang | H01Q 15/0086 343/702 |
| 2011/0012808 | A1 | 1/2011 | Tatarnikov | |
| 2011/0193755 | A1 * | 8/2011 | Lindenmeier | H01Q 1/3275 343/715 |
| 2013/0169490 | A1 * | 7/2013 | Pascolini | H01Q 5/357 343/702 |
| 2014/0266503 | A1 | 9/2014 | Apostolos | |
| 2017/0062917 | A1 * | 3/2017 | Hyjazie | H01Q 1/362 |
| 2018/0090830 | A1 * | 3/2018 | Mcmichael | H01Q 9/145 |
| 2018/0198536 | A1 | 7/2018 | Smolyaninov | |
| 2018/0219280 | A1 * | 8/2018 | Fedan | H01Q 1/3291 |
| 2018/0269577 | A1 * | 9/2018 | Kosaka | H01Q 5/48 |
| 2019/0027819 | A1 * | 1/2019 | Terashita | H01Q 1/42 |
| 2022/0052457 | A1 | 2/2022 | Arumugam | |

OTHER PUBLICATIONS

Smolyaninov et al.. "Superlensing enables radio communication and imaging underwater". Sci Rep 13. 18333 (2023). https://doi.org/10.1038/s41598-023-45663-6 https://www.nature.com/articles/s41598-023-45663-6 Date of publication: Oct. 26, 2023 (7 pgs).

Nikolaev et al. "Surface Electromagnetic Wave-Based wireless Communication System for Mines." IOP Conference Series: Earth and Environmental Science. vol. 720. No. 1. IOP Publishing, 2021. (8pgs).

PCT International Search Report and Written Opinion of PCT Applicatioin No. PCT/US2024/061379, mailed Feb. 21, 2025 (9 pages).

* cited by examiner

SURFACE ELECTROMAGNETIC WAVE ANTENNA

FIELD OF TECHNOLOGY

The present disclosure relates generally to communications technology, and more specifically to maintaining the resonance of single-frequency and multi-frequency surface electromagnetic wave (SEW) antennas.

BACKGROUND

In the field of wireless communication, antennas are essential components that enable the transmission and reception of electromagnetic waves. These devices may come in various designs, each tailored to specific applications and frequency ranges. A typical antenna design may include elements such as dipoles or helices, which are responsible for radiating electromagnetic energy into the surrounding space. The performance of these antennas may be characterized by parameters such as radiation patterns, impedance, and bandwidth.

SUMMARY

The described implementations relate to improved SEW antennas and associated methods for maintaining resonance in single-frequency and multi-frequency SEW antennas. In some examples, an SEW antenna design may utilize a quarter-wave resonant helix structure. This design may be capable of supporting strong electric and magnetic fields at the tip of the antenna, which may facilitate efficient energy transfer to surface electromagnetic waves. Some implementations may allow the excitation of plasmon/polariton charges at the interface between two materials with a substantial difference in dielectric properties or electrical conductivity. By incorporating a spherical metal particle at the antenna tip, some implementations may ensure a consistent resonance frequency, which may facilitate maintaining efficient coupling to surface waves and achieving a stable performance across various conductive interfaces.

Furthermore, some implementations may offer versatility through the use of multiple tapping points along the helix structure, enabling multiband operation. This feature may allow the antenna to resonate at different frequencies by selecting the appropriate tapping point, thus providing a solution for applications requiring communication over multiple frequency bands. Some implementations may operate in close proximity to, or even in direct contact with, conductive surfaces without significant performance degradation, representing a significant advancement over traditional antennas. Some implementations may not only overcome the limitations imposed by the Chu-Harrington limit but also offer a compact and efficient solution for challenging communication environments.

An SEW antenna is described. The SEW antenna may include a tip, wherein the tip includes a spherical particle configured for maintaining resonance frequency in response to proximity to a conducting surface. The SEW antenna may include a resonant helix supporting a strong electric field at the tip of the SEW antenna and a strong magnetic field within a core of the SEW antenna. The SEW antenna may include one or more feed points located on the resonant helix, a given feed point corresponding to a given operating frequency band.

A method for maintaining resonance frequency of an SEW antenna in response to proximity to a conducting surface is described. The method may include positioning a tip of the SEW antenna, which includes a spherical particle, near the conducting surface. The method may include supporting a strong electric field at the tip of the SEW antenna and a strong magnetic field within a core of the SEW antenna using a resonant helix. The method may include selecting one or more feed points located on the resonant helix, wherein a given feed point corresponds to a given operating frequency band.

Some examples of the technologies and related methods described herein may further include a ground plate positioned at the base of the resonant helix. The ground plate may be configured to facilitate impedance matching between the SEW antenna and the conductive surface.

In some examples of the technologies and related methods described herein, the spherical particle at the antenna tip configuration may be composed of a conductive material that is the same as or different from the material of the conductive surface in response to which the resonance frequency is maintained.

Some examples of the technologies and related methods described herein may further include a feed coax line connected to the given feed point. The feed coax line may be configured to transmit electromagnetic energy to the resonant helix without substantial reflection.

Some examples of the technologies and related methods described herein may further include a switch network operatively connected to the one or more feed points. The switch network may be configured to selectively activate a high-frequency tap or a low-frequency tap for a desired operating frequency band.

In some examples of the technologies and related methods described herein, the resonant helix may be oriented in a side view configuration such that the axis of the helical antenna is parallel to the conducting surface.

In some examples of the technologies and related methods described herein, the antenna structure may be filled with a dielectric material to maintain the resonance frequency in response to variations in the proximity to the metal surface.

In some examples of the technologies and related methods described herein, the antenna feed point may be adjustable along the resonant helix to enable tuning of the operating frequency band in response to changes in the surrounding environment.

In some examples of the technologies and related methods described herein, the resonant helix may be encapsulated in a protective coating to prevent direct contact with the metal surface while maintaining capacitive coupling.

In some examples of the technologies and related methods described herein, the spherical particle may be dimensioned to optimize the capacitive coupling with the metal surface for different metal surface types.

In some examples of the technologies and related methods described herein, the feed line may be integrated within the structure of the resonant helix to minimize interference and maintain signal integrity.

In some examples of the technologies and related methods described herein, the switch network may include a plurality of electronically controlled relays to facilitate rapid switching between a high frequency tap and a low frequency tap.

In some examples of the technologies and related methods described herein, the antenna tip configuration may include a plurality of spherical particles. Each spherical particle may correspond to a different operating frequency band.

DETAILED DESCRIPTION

Figure 1:
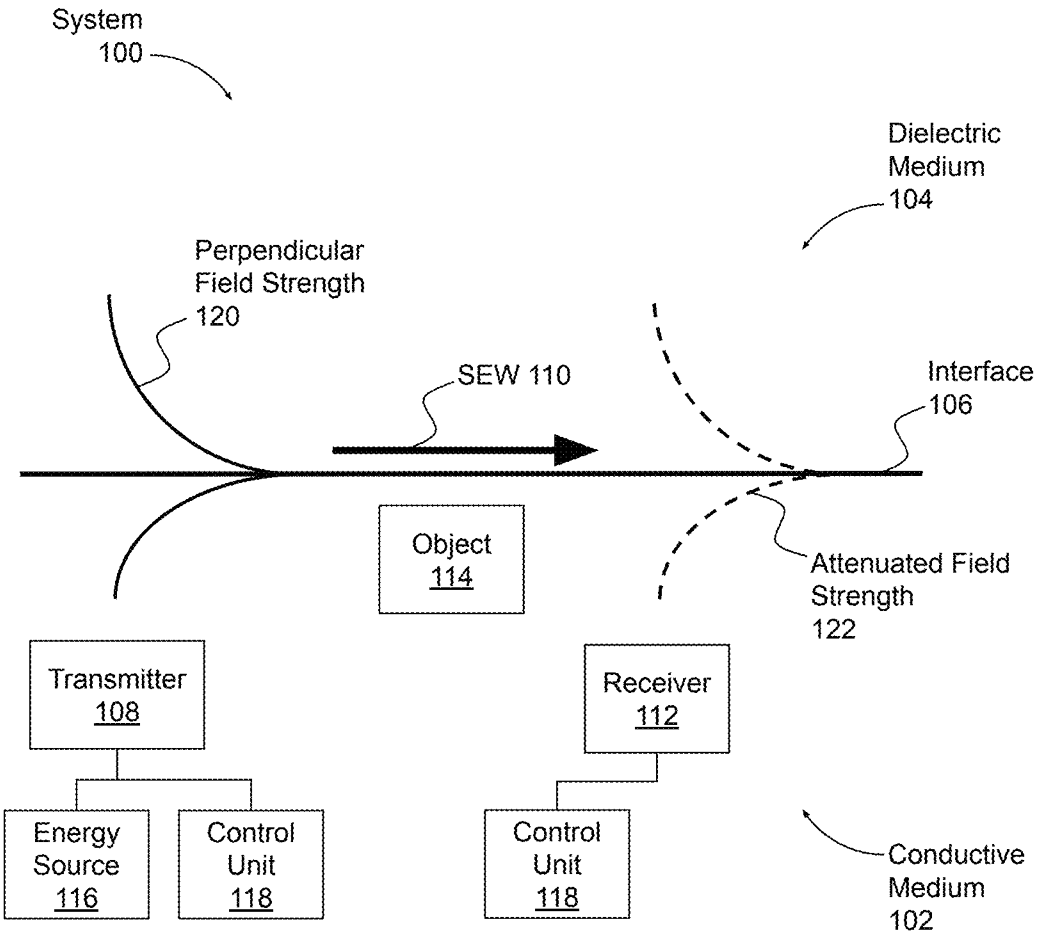
FIG. 1 illustrates a system that demonstrates the concept of surface electromagnetic waves (SEWs), in accordance with one or more implementations.

The described implementations relate to improved SEW antennas and associated methods for maintaining resonance in single-frequency and multi-frequency SEW antennas. In some examples, conventional antenna designs may face challenges when required to operate in environments with conductive interfaces, such as metal surfaces or wet ground. In such scenarios, the antenna's ability to radiate may be compromised due to the formation of image currents and the resulting destructive interference. This may lead to a significant reduction in the antenna's radiation efficiency and bandwidth. Additionally, the miniaturization of antennas to fit into compact devices often results in a trade-off between size and performance, as dictated by a known limit. This limit poses a fundamental challenge in achieving a high-quality factor and wide bandwidth for small antennas. Consequently, there may be a pressing need for an antenna design that can overcome these limitations, maintain consistent performance in the vicinity of conductive materials, and offer multi-band operation without compromising on size.

According to some implementations, an SEW antenna design may include a helix structure that resonates at a quarter wavelength of the lowest frequency of operation. This structure may support strong magnetic fields within its core and strong electric fields near its tip, which may facilitate transferring electromagnetic energy to a surface. The antenna may have a spherical metal particle at its tip to maintain consistent resonance frequency and efficient coupling to surface electromagnetic waves.

The antenna may be designed to match impedance by having a low impedance at the tip when in contact or near contact with a metal or other conductive surface. This design may ensure that the power from the coaxial line is transferred to the charges on the metal surface, initiating a plasmon wave. The antenna may interface with a metal plane, which represents a surface with a significant difference in dielectric or conductive properties from air.

The resonant frequency of the antenna may be highly sensitive to the capacitance between the tip and the metal surface. The spherical metal particle at the tip may help to keep this capacitance constant. The antenna may be positioned in various orientations with respect to the interface surface, including along the normal to the interface surface or tilted at various angles up to parallelism. The tip of the antenna may be bent to orthogonality to the interface to ensure maximum electric energy coupling.

For multiband operation, the antenna may be tapped at more than one point to achieve multichannel performance. The tapping point for the high-frequency channel may be found while the lower frequency feed line is open-circuited. This allows for the antenna to operate at different frequencies by using different tapping points, each connected to a high impedance termination except the one operating at the desired frequency.

The antenna may exhibit a larger bandwidth when brought in proximity to a metal surface, indicating strong coupling to the electromagnetic fields of the surface wave mode. This may indicate that the antenna overcomes the Chu-Harrington limit on the quality factor of a conventional small radio frequency antenna.

The antenna may include a helix structure. The axial dimension of the helix structure may be substantially reduced by filling the inner volume of the helix with a material of high magnetic permeability or high dielectric constant. According to some implementations, these materials have a very low loss factor. A switch network may be used to keep the load of the inactive line open-circuited, allowing for the selection of different tapping points for operation at different frequencies.

The design may include variations where the coaxial line serves as the ground or a ground plane is used. This may be important for preventing electromagnetic energy from reflecting back into the system.

Aspects of the subject matter described in this disclosure can be implemented to realize one or more of the following potential advantages. The described techniques may be implemented to support enhanced communication capabilities in environments where conventional antennas are ineffective. The SEW antenna design may allow for efficient energy transfer to surface waves in various mediums, which may be beneficial for applications requiring transmission through conductive barriers. The antenna may provide versatility in its deployment, as it may be oriented in multiple configurations to adapt to different interface surfaces. The ability to operate at multiple frequencies with a single antenna design may offer cost-effective solutions for complex communication systems. The described antenna may maintain its resonant frequency across a range of conditions, which may be critical for consistent performance. The potential for reduced antenna size without compromising bandwidth may be advantageous for portable devices where space is at a premium. The switch network may enable seamless switching between frequencies, which may facilitate operating across different communication standards. The described antenna may be implemented in a manner that is resistant to physical variations in the contact surface, which may ensure reliability in real-world applications.

Aspects of the disclosure are initially described in the context of SEW antennas. Aspects of the disclosure are additionally illustrated by and described with reference to example implementations. Aspects of the disclosure are further illustrated by and described with reference to a flowchart that relates to methods of using SEW antennas for maintaining resonance in single-frequency and multi-frequency SEW antennas.

FIG. 1 illustrates a system 100 that demonstrates the concept of surface electromagnetic waves or SEWs, in accordance with one or more implementations. The system 100 may include a conductive medium 102, such as a body of water, organic tissue, a metallic plane, and/or other conductive media. Adjacent to the conductive medium 102, there may be a dielectric medium 104, such as air and/or other dielectric media, which may interface with the conductive medium 102. The interface 106 between the conductive medium 102 and the dielectric medium 104 may be where SEWs are generated and may propagate.

The system 100 may also include a transmitter antenna 108, which may be positioned near the interface 106. The antenna 108 may be positioned within the conductive medium 102 or within the dielectric medium 104. The antenna 108 may be responsible for generating an electromagnetic field that may excite SEWs at the interface 106 of the conductive medium 102 and the dielectric medium 104. The excited SEWs may then travel along the interface 106, as indicated by the arrow of SEW 110, which may represent the direction of wave propagation.

To help visualize the phenomenon of SEWs, one may consider an analogy to ripples on a pond. When a stone is dropped into a still pond, ripples may form and spread out across the surface of the water. Similarly, the antenna 108 may be thought of as the stone, and the SEWs may be akin to the ripples that spread along the conductive medium 102. Just as the ripples may move outward from the point of impact, SEWs may propagate along the interface 106, carrying energy with them.

The system 100 may further include a detector 112, which may be positioned at a distance from the antenna 108 along the interface 106. The detector 112 may be positioned within the conductive medium 102 or within the dielectric medium 104. The detector 112 may be configured to receive the SEWs after they have propagated along the interface 106. This may be analogous to placing one's hand in the water at a distance from where the stone was dropped, feeling the ripples as they pass by.

Additionally, the system 100 may include an object 114 positioned within the conductive medium 102 or within the dielectric medium 104, which may be representative of an obstacle that SEWs may encounter during propagation. The interaction of SEWs with the object 114 may lead to scattering of waves, similar to how water ripples may change direction or form patterns when they encounter a leaf or a rock in the pond.

The system 100 may include an energy source 116, such as a radio frequency generator, which may be connected to the antenna 108. The energy source 116 may provide the necessary power for the antenna 108 to generate the electromagnetic fields that excites the SEWs. This may be thought of as the force with which the stone is thrown into the pond, affecting the size and strength of the resulting ripples.

In some implementations, the system 100 may include a control unit 118, which may be operatively coupled to the antenna 108 and/or the detector 112. The control unit 118 may be responsible for coordinating the generation and detection of SEWs, much like a person orchestrating the timing of stones being dropped into the pond to create a specific pattern of ripples.

From a more technical perspective, SEWs may be understood as a type of wave that propagates along the interface between two media with different dielectric properties. In FIG. 1, the conductive medium 102 and the dielectric medium 104 may form such an interface (e.g., interface 106) where SEWs may be excited and propagate. The antenna 108 may serve as a transducer that converts electrical signals from the energy source 116 into electromagnetic fields, which may then couple to the interface 106 and give rise to SEWs.

The propagation of SEWs along the interface 106 may be characterized by a propagation wave vector that is parallel to the interface 106. This wave vector may be larger than the wave vector of free photons in the dielectric medium 104, which may result in a confinement of the electromagnetic field to the vicinity of the interface 106. The SEW's field strength may decay exponentially in the direction perpendicular to the interface 106, as illustrated by a field strength 120 extending into the dielectric medium 104 and the conductive medium 102. These field strengths also decay as the SEW propagates along the interface 106, as illustrated by an attenuated field strength 122. The detector 112 may be designed to couple to these confined, attenuated fields and receive the SEWs after they have propagated along the interface 106.

The excitation of SEWs by the antenna 108 may involve the conversion of the electromagnetic energy into a surface-bound mode, which may be facilitated by the specific design of the antenna 108. The antenna 108 may be optimized to match the impedance of the SEWs to maximize energy transfer into the surface wave mode. The object 114 submerged within the conductive medium 102 may introduce perturbations in the SEWs, which may be detected by the detector 112 and analyzed by the control unit 118 to infer properties of the object 114. Examples of such properties may include one or more of size, shape, location, material properties, and/or other properties.

The mathematical description of SEWs may be derived from Maxwell's equations, which govern the behavior of electromagnetic fields. The wave equation for TM-polarized SEWs may be reduced to a one-dimensional Schrodinger equation:

$$\frac{d^2\psi}{dz^2} + \left(k^2 - V(z)\right)\psi = 0 \qquad \text{(EQN. I)}$$

where $\psi$ is the effective wave function introduced as $E_z=\psi/\sqrt{\epsilon}$, and V (z) is the effective potential energy that guides the propagation of SEWs along the interface. The term $k^2$ may represent the total energy of the SEWs.

For TE-polarized SEWs, the wave equation may not depend on the gradient terms and may be expressed as:

$$\frac{d^2E_z}{dz^2} + k^2E_z = 0 \qquad \text{(EQN. 2)}$$

In the case of a sharp interface between two media with dielectric permittivities $\epsilon_1$ and $\epsilon_2$, the SEW wave vector for TM-polarized waves may be given by:

$$k_{SEW} = \sqrt{\frac{\omega^2}{c^2}\frac{\epsilon_1\epsilon_2}{\epsilon_1+\epsilon_2}} \qquad \text{(EQN. 3)}$$

where ω is the angular frequency of the SEWs, and c is the speed of light in vacuum.

The presence of dielectric permittivity gradients across the interface 106 may lead to additional terms in the effective potential $V_z$, which may result in the formation of a potential well that supports bound states of SEWs. These bound states may correspond to surface modes with long propagation lengths and may be excited by the antenna 108 with appropriate phase matching.

The system 100 may thus utilize SEWs for various applications, including communication and sensing, by exploiting the unique properties of SEWs at the interface 106 between the conductive medium 102 and the dielectric medium 104. The control unit 118 may process the received signals to extract information about the propagation and interaction of SEWs with the environment and objects within it.

Figure 2:
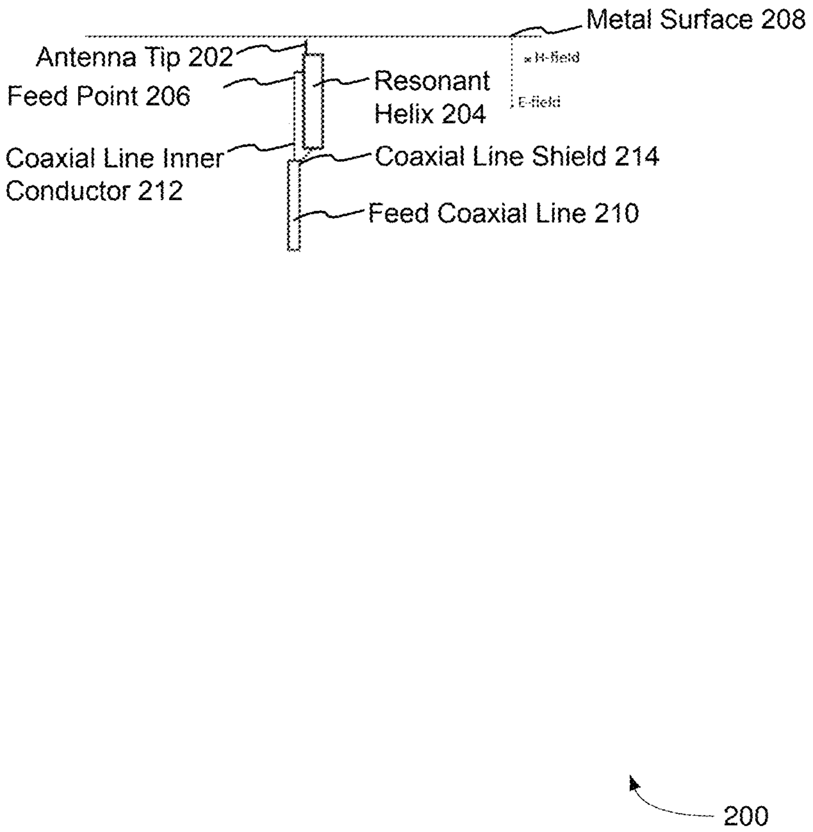
FIG. 2 shows an antenna structure diagram which supports techniques for maintaining resonance in single-frequency SEW antennas in accordance with various aspects of the present disclosure.

FIG. 2 shows an antenna structure diagram 200 which supports techniques for maintaining resonance in single-frequency SEW antennas in accordance with various aspects of the present disclosure. As depicted in FIG. 2, the antenna structure diagram 200 may include one or more of an antenna tip 202, a resonant helix 204, one or more feed points 206, a metal surface 208, a feed coaxial line 210, a coaxial line inner conductor 212, a coaxial line shield 214, and/or other components.

The antenna tip 202 may serve as the point of interaction with the metal surface 208. In some implementations, the antenna tip 202 may be designed to be in close proximity to the metal surface 208 to facilitate the transfer of electromagnetic energy. The antenna tip 202 may be configured with a specific shape, such as a spherical metal particle, to maintain a consistent capacitance with the metal surface 208. The antenna tip 202 may influence the resonant frequency of the antenna by its capacitive relationship with the metal surface 208. In some implementations, the antenna tip 202 may be formed in various shapes to accommodate different metal surfaces 208 it may encounter.

The resonant helix 204 may form the main body of the antenna structure diagram 200. In some implementations, the resonant helix 204 may support both a strong magnetic field in its core and a strong electric field near its tip. The resonant helix 204 may have an electrical length of λ/4, which may contribute to its resonant properties at a desired frequency. The resonant helix 204 may be designed to have a high impedance at one end when the other end is loaded by a low impedance, such as the metal surface 208. In some implementations, the resonant helix 204 may be filled with materials of high magnetic permeability or high dielectric constant to adjust its axial dimension.

The one or more feed points 206 may provide connection points for the feed coaxial line 210. In some implementations, the feed point(s) 206 may be located at positions on the resonant helix 204 where the impedance matches that of the feed coaxial line 210. The feed point(s) 206 may be tapped at different locations along the resonant helix 204 to enable multiband operation of the SEW antenna 202. The feed point(s) 206 may be connected to a switch network to selectively activate different frequency bands. In some implementations, the feed point(s) 206 may be designed to maintain a high impedance termination for all but the active frequency band.

The metal surface 208 may act as a platform for the SEW antenna 202 to couple with surface electromagnetic waves. In some implementations, the metal surface 208 may have a characteristic wave impedance much lower than that of free space. The metal surface 208 may be a plane with a strong difference in dielectric or conductive properties from air. The metal surface 208 may be part of various structures, such as walls or enclosures, where the SEW antenna 202 is intended to operate. In some implementations, the metal surface 208 may be composed of different conductive materials, affecting the coupling efficiency of the SEW antenna 202.

The feed coaxial line 210 may connect the SEW antenna 202 to external circuitry or devices. In some implementations, the feed coaxial line 210 may be designed to carry the power from the external circuitry to the SEW antenna 202. The feed coaxial line 210 may have a characteristic impedance, such as 50Ω, which may be matched by the feed point(s) 206 for efficient power transfer. The feed coaxial line 210 may be routed towards the feed point(s) 206 in various configurations depending on the design of the antenna structure diagram 200. In some implementations, the feed coaxial line 210 may be shielded to prevent unwanted interference with the SEW antenna 202. The coaxial line inner conductor 212 of the feed coaxial line 210 may connect to the feed point(s) 206. The resonant helix 204 may be grounded to the coaxial line shield 214.

In some implementations, the resonant helix 204 may be positioned perpendicular to the metal surface 208, with the antenna tip 202 in close proximity to the metal surface 208. The feed coaxial line 210 may be connected to the resonant helix 204 at the feed point(s) 206, which may be located at a position where the impedance matches that of the feed coaxial line 210. The resonant helix 204 may support a strong magnetic field in its core and a strong electric field near its tip, facilitating the transfer of electromagnetic energy to the metal surface 208.

Figure 3:
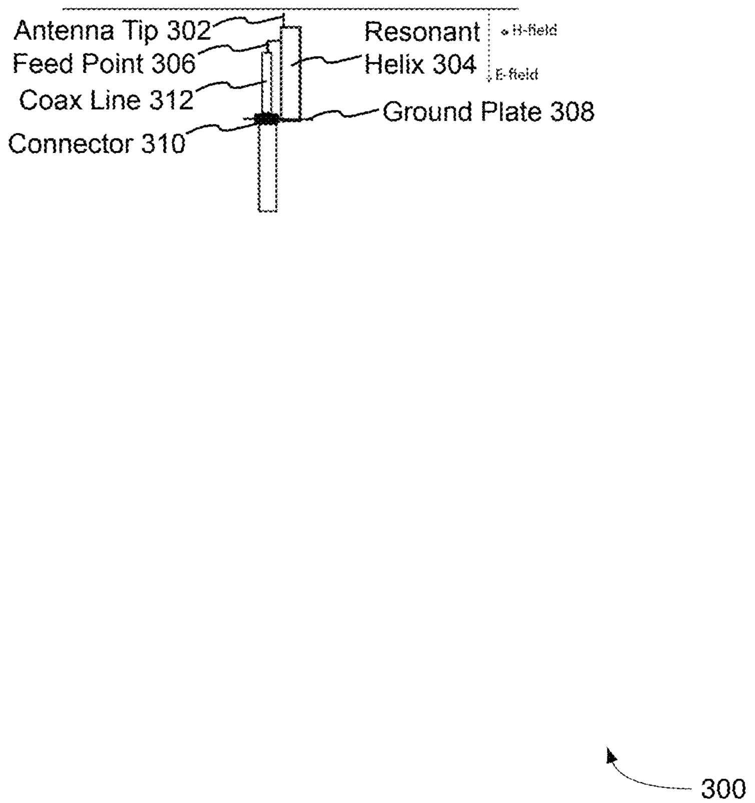
FIG. 3 shows an antenna structure diagram which supports techniques for maintaining resonance in single-frequency SEW antennas in accordance with various aspects of the present disclosure.

FIG. 3 shows an antenna structure diagram 300 which supports techniques for maintaining resonance in single-frequency SEW antennas in accordance with various aspects of the present disclosure. As depicted in FIG. 3, the antenna structure diagram 300 may include one or more of an antenna tip 302, a resonant helix 304, one or more feed points 306, a ground plate 308, a connector 310, a coax line 312, and/or other components.

The antenna tip 302 may serve as the point of interaction with the electromagnetic fields. The antenna tip 302 may be designed to be in close proximity to a conductive surface. The antenna tip 302 may have a spherical metal particle at its apex to maintain a consistent capacitance with the metal surface. In some implementations, the antenna tip 302 may be bent to orthogonality to the interface to ensure maximum electric energy coupling. The antenna tip 302 may be formed in various shapes to accommodate different operational environments.

The resonant helix 304 may form the main body of the antenna structure, allowing for the resonance at specific frequencies. The resonant helix 304 may support both a strong magnetic field in its core and a strong electric field near its tip. The resonant helix 304 may have an electrical length of λ/4, where one end is loaded by a low impedance and the other end displays a high impedance. In some implementations, the resonant helix 304 may be filled with a material of high magnetic permeability or high dielectric constant to reduce its axial dimension. The resonant helix 304 may be structured in various configurations, such as a quarter wave resonant helix, to support different modes of operation.

The one or more feed points 306 may provide locations where the antenna can be driven by an external signal. The feed point(s) 306 may be tapped at different points on the resonant helix 304 to achieve multichannel performance.

The feed point(s) 306 may be positioned to match the impedance of the waves excited by the polariton motion. In some implementations, the feed point(s) 306 may be connected to a switch network to keep the load of the inactive line open-circuited. The feed point(s) 306 may be designed to accommodate different tapping points for plasmon radiation at various frequencies.

The ground plate 308 may act as a reference point for the antenna's operation within the system. The ground plate 308 may be used in conjunction with a balun to prevent electronic energy from reflecting back into the system. The ground plate 308 may vary in size and shape to suit the specific design requirements of the antenna structure. In some implementations, the ground plate 308 may be omitted, and the coax line 312 may serve as the ground reference.

The connector 310 may enable the attachment of the antenna to external devices or systems. The connector 310 may be designed to facilitate the transfer of power from the coaxial line to the charges on the metal surface. The connector 310 may be a standard type, such as an SMA connector, or a custom design specific to the antenna system. In some implementations, the connector 310 may be integrated into the antenna structure to minimize signal loss.

The coax line 312 may carry the signal to and from the antenna structure for processing and use. The coax line 312 may be designed to have a characteristic impedance, such as 50Ω, to match the feed point of the resonant structure. The coax line 312 may be routed towards the antenna structure in a way that minimizes interference and maximizes signal integrity. In some implementations, the coax line 312 may be shielded to protect against external electromagnetic interference. The coax line 312 may be of varying lengths to accommodate different installation scenarios.

In some implementations, the antenna tip 302 may be positioned at the end of the resonant helix 304, which may be oriented perpendicular to a metal/dielectric interface. The resonant helix 304 may be connected to the ground plate 308 at its base. The one or more feed points 306 may be located along the length of the resonant helix 304, allowing for the input of external signals.

The connector 310 may be attached to the ground plate 308, facilitating the connection between the coax line 312 and the antenna structure. The coax line 312 may extend from the connector 310, providing a pathway for signals to travel to and from the antenna. In some implementations, the ground plate 308 may serve as a stabilizing base for the entire antenna structure, ensuring proper alignment and positioning of the resonant helix 304 and the antenna tip 302 relative to the metal/dielectric interface.

Figure 4:
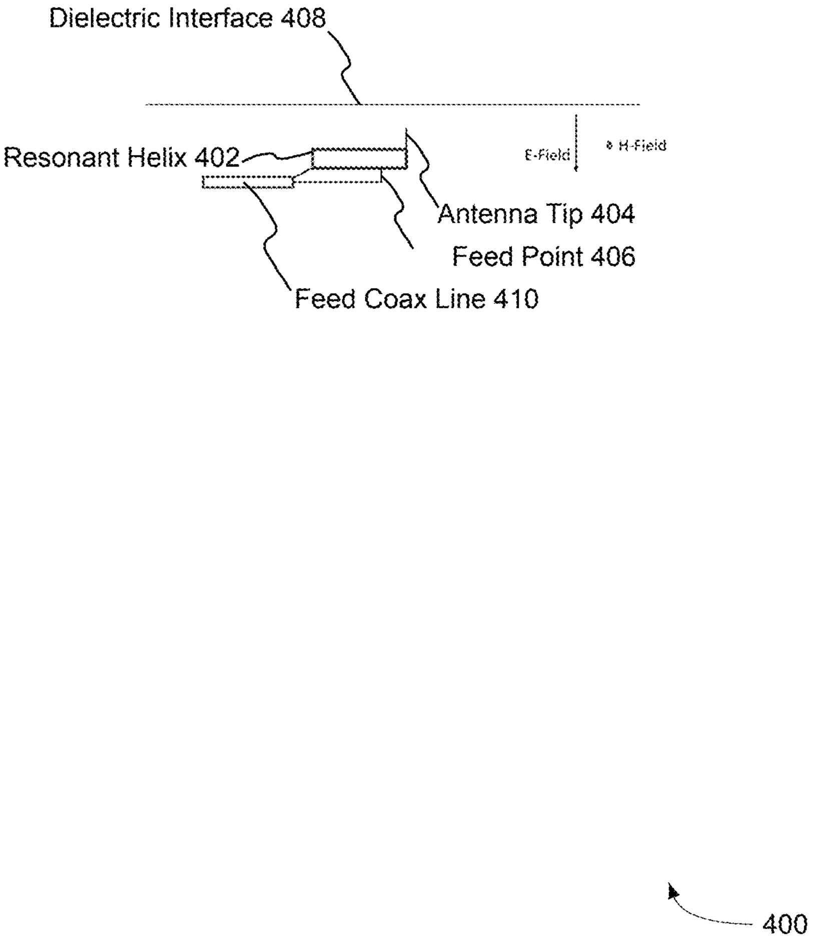
FIG. 4 shows an antenna structure diagram which supports techniques for maintaining resonance in single-frequency SEW antennas in accordance with various aspects of the present disclosure.

FIG. 4 shows an antenna structure diagram 400 which supports techniques for maintaining resonance in single-frequency SEW antennas in accordance with various aspects of the present disclosure. As depicted in FIG. 4, the antenna structure diagram 400 may include one or more of a resonant helix 402, an antenna tip 404, one or more feed points 406, a dielectric interface 408, a feed coax line 410, and/or other components.

The resonant helix 402 may serve as the primary structure for supporting the electromagnetic fields necessary for SEW or plasmonic resonance. In some implementations, the resonant helix 402 may be configured as a quarter wave resonant structure. The resonant helix 402 may be designed to support a strong magnetic field within its core. The resonant helix 402 may have a high impedance at one end when the other end is loaded by a low impedance. The resonant helix 402 may be made from a conductive material capable of carrying the required current for operation. The resonant helix 402 may be positioned along the normal to the interface surface or may be tilted to various angles.

The antenna tip 404 may be designed to enhance the displacement currents at the point of interaction with the dielectric interface. In some implementations, the antenna tip 404 may be configured to be in close proximity to the dielectric interface to facilitate charge transfer. The antenna tip 404 may be shaped to concentrate the electric field at the point of interaction. The antenna tip 404 may be bent to orthogonality to the interface to ensure maximum electric energy coupling. The antenna tip 404 may be part of a structure that can be fed at a 50Ω feed point for power transfer. In some implementations, a spherical particle (see FIG. 5) may be attached to the antenna tip 404 to maintain a consistent (e.g., same or similar) capacitance with the dielectric interface 408. In some implementations, the spherical particle may be formed from a conductive material. The spherical particle may be designed to minimize variations in capacitance due to changes in the proximity to the dielectric interface. The spherical particle may be a metal sphere that ensures the resonant frequency of the SEW antenna remains approximately constant. The spherical particle may interact with the dielectric interface to form a dipole source for the polariton waves.

The one or more feed points 406 may provide the locations where the feed coax line can be connected to the resonant helix for signal input. In some implementations, the feed point(s) 406 may be tapped at different locations along the resonant helix 402 to achieve multiband performance. The feed point(s) 406 may be selected based on the impedance characteristics required for the operation of the SEW antenna. The feed point(s) 406 may be connected to a switch network to allow for the selection of different operating frequencies. The feed point(s) 406 may be designed to maintain a 50Ω impedance match for efficient power transfer.

The dielectric interface 408 may represent the boundary across which the SEW antenna conveys electromagnetic waves. In some implementations, the dielectric interface 408 may be a metal plane with a strong difference in dielectric or conductive properties from air. The dielectric interface 408 may be part of a structure that can act as a dipolar source when coupled with the SEW antenna. The dielectric interface 408 may vary in nature, affecting the impedance of the waves excited by the polariton motion. The dielectric interface 408 may be the surface that supports waves propagating along it when excited by the SEW antenna.

The feed coax line 410 may carry the signal from the source to the resonant helix of the SEW antenna. In some implementations, the feed coax line 410 may be connected to the resonant helix 402 at the 50Ω feed point. The feed coax line 410 may be designed to transfer all the coaxial line power to the charges on the metal surface. The feed coax line 410 may be backed towards higher impedance points away from the tip of the antenna. The feed coax line 410 may be part of a system that includes a switch network for selecting different feed points 406.

In some implementations, the resonant helix 402 may be arranged such that its axis is parallel to the dielectric interface 408. The antenna tip 404 may be positioned near the dielectric interface 408 to enhance the coupling of electromagnetic waves. The spherical particle may be located at the antenna tip 404 to maintain a consistent capacitance with the dielectric interface 408.

The feed coax line 410 may be connected to one of the feed point(s) 406 on the resonant helix 402 to supply the signal. The resonant helix 402 may generate a strong magnetic field within its core, while the antenna tip 404 may concentrate the electric field at the point of interaction with the dielectric interface 408. The spherical particle may help stabilize the resonant frequency of the SEW antenna by maintaining a consistent capacitance with the dielectric interface 408.

Figure 5:
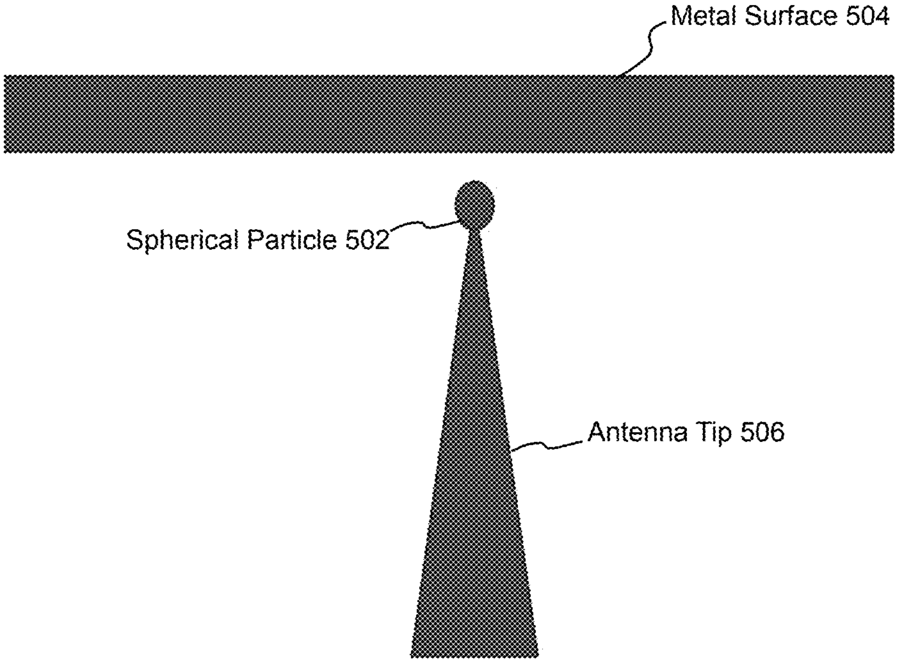
FIG. 5 shows antenna tip configuration which supports techniques for maintaining resonance in single-frequency SEW antennas in accordance with various aspects of the present disclosure.

FIG. 5 shows antenna tip configuration 500 which supports techniques for maintaining resonance in single-frequency SEW antennas in accordance with various aspects of the present disclosure. As depicted in FIG. 5, the antenna tip configuration 500 may include one or more of a spherical particle 502, a metal surface 504, an antenna tip 506, and/or other components.

The spherical particle 502 may serve as a distinct element at the apex of the antenna tip 506. The spherical particle 502 may be formed of a conductive material. The spherical particle 502 may be positioned to interact with the metal surface 504. For example, the spherical particle 502 may be positioned near to or in contact with the metal surface 504. In some implementations, a distance between the spherical particle 502 and the metal surface 504 may range from zero to a few mm. That distance may be fixed during operation, or it may change over time. The spherical particle 502 may be designed to maintain a specific geometric shape to influence its interaction with the metal surface 504. In some implementations, the spherical particle 502 may be replaced with other geometric shapes that provide a similar function.

The spherical particle 502 may be composed of one or more materials. Examples of such materials may include one or more metal parts and/or other materials. The physical dimensions of the spherical particle 502 may be determined based on impedance matching requirements. In some implementations, the radius of the spherical particle 502 may be 0.5 to 5 mm. In some implementations, the spherical particle 502 and the antenna tip 506 may be formed as a single, unitary object. In some implementations, the spherical particle 502 may be affixed to the end of the antenna tip 506 by soldering or welding.

The metal surface 504 may act as a conductive plane in close proximity to the antenna tip 506. The metal surface 504 may be composed of various conductive materials. The metal surface 504 may be positioned to receive energy from the antenna tip 506. The metal surface 504 may be part of a larger structure that the antenna tip configuration 500 is designed to interact with. In some implementations, the metal surface 504 may be substituted with other conductive materials that serve a similar purpose.

The antenna tip 506 may be designed to resonate at specific frequencies. The antenna tip 506 may be part of an antenna (see, e.g., FIGS. 2-4) that interacts with the metal surface 504. The antenna tip 506 may be configured to initiate the propagation of surface electromagnetic waves when positioned near the metal surface 504. The antenna tip 506 may be adjustable to tune the resonance frequency as needed. In some implementations, the antenna tip 506 may be constructed from various materials that support its resonant function.

In some implementations, the spherical particle 502 may be positioned at the very end of the antenna tip 506 to enhance the interaction with the metal surface 504. The antenna tip 506 may extend towards the metal surface 504, with the spherical particle 502 forming the point of closest approach. The spherical particle 502 may influence the capacitance between the antenna tip 506 and the metal surface 504, which may be crucial for tuning the resonant frequency of the antenna tip 506.

Figure 6:
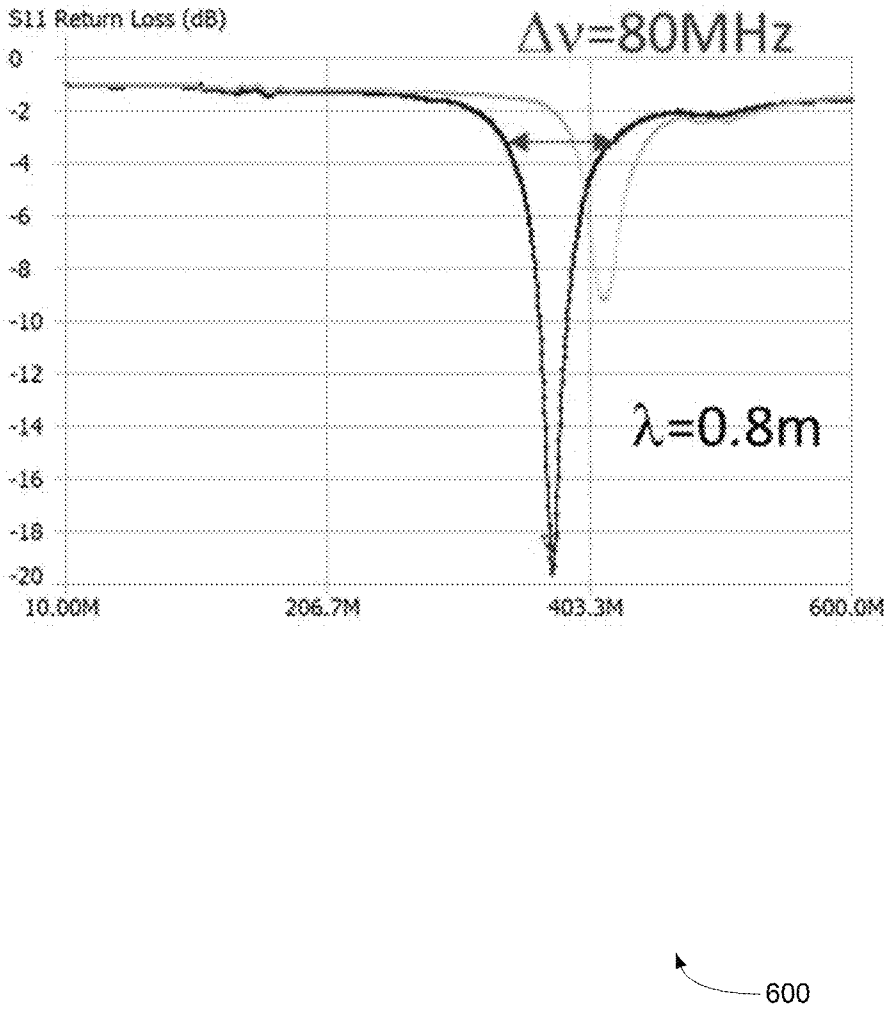
FIG. 6 shows a line graph which supports techniques for maintaining resonance in single-frequency SEW antennas in accordance with various aspects of the present disclosure.

FIG. 6 shows a line graph 600 illustrating the S11 return loss (dB) versus frequency (MHz) for a 374 MHz SEW antenna in accordance with various aspects of the present disclosure. The graph 600 may represent the performance characteristics of the SEW antenna when positioned in proximity to a metal surface.

The x-axis of the graph 600 may represent the frequency in megahertz (MHz), ranging from 100 MHz to 600 MHz. The y-axis may represent the S11 return loss in decibels (dB), ranging from 0 dB to −20 dB. The graph 600 may use a linear scale for both axes.

The data points in the graph 600 may be represented by a line plot, showing the return loss of the plasmonic antenna across the specified frequency range. The graph 600 may exhibit a notable dip in return loss around the 374 MHz frequency, indicating the resonant frequency of the antenna. This dip may be marked by a sharp decrease in return loss, reaching a minimum value, and then rising again as the frequency moves away from 374 MHz.

The graph 600 may highlight a bandwidth (Δv) of 80 MHz, as indicated by the horizontal arrows spanning from approximately 363 MHz to 443 MHz. This bandwidth may be significantly larger than the expected bandwidth according to the Chu-Harrington limit, which would predict a bandwidth of 4.6 MHz for a conventional small RF antenna with similar dimensions. The Chu-Harrington limit on the Q factor of a conventional small RF antenna may be written as:

$$Q \geq \frac{1}{k^3 a^3} + \frac{1}{ka} \quad \text{(EQN. 4)}$$

where α is the radius of the smallest sphere containing the antenna, and k is the wave vector in free space. Generally speaking, the usable bandwidth of an antenna may be determined by the −10 dB return loss (not 3 dB).

In the case of the 374 MHz SEW antenna based on the design shown in FIG. 2, a=0.03 m, and according to the Chu-Harrington limit its Q factor must be Q>81. Therefore, the antenna bandwidth may not exceed Δv=4.6 MHz. On the other hand, as illustrated in FIG. 6, when brought in the proximity of a metal surface, this antenna exhibits a much larger 80 MHz bandwidth. This 20× performance improvement over the Chu-Harrington limit indicates strong coupling between the SEW antenna and the electromagnetic fields of the SEW mode propagating along the metal surface. Similar performance improvements have been observed in cases where SEW antennas operated near other conductive interfaces, such as water or wet ground.

The graph 600 may demonstrate that the SEW antenna, when brought in proximity to a metal surface, exhibits a much larger bandwidth than predicted by traditional antenna theory. This performance improvement may be attributed to the strong coupling between the SEW antenna and the electromagnetic fields of the SEW mode propagating along the metal surface. Thus, the line graph 600 may provide a visual representation of the enhanced bandwidth performance of the 374 MHz SEW antenna, illustrating its ability to exceed the Chu-Harrington limit when operated near conductive surfaces.

SEW antennas may be used to considerably reduce antenna dimensions in applications where compact antenna dimensions are desired. For a given diameter, the axial dimension of the antenna can be substantially reduced by filling the inner volume of the helix with a material of high magnetic permeability or high dielectric constant. In some implementations, the materials have a very low loss factor. One combination may include a magnetic filling from the base of the antenna to approximately 75% of its height. The length of the volume near the tip may be reduced using a dielectric material.

Figure 7:
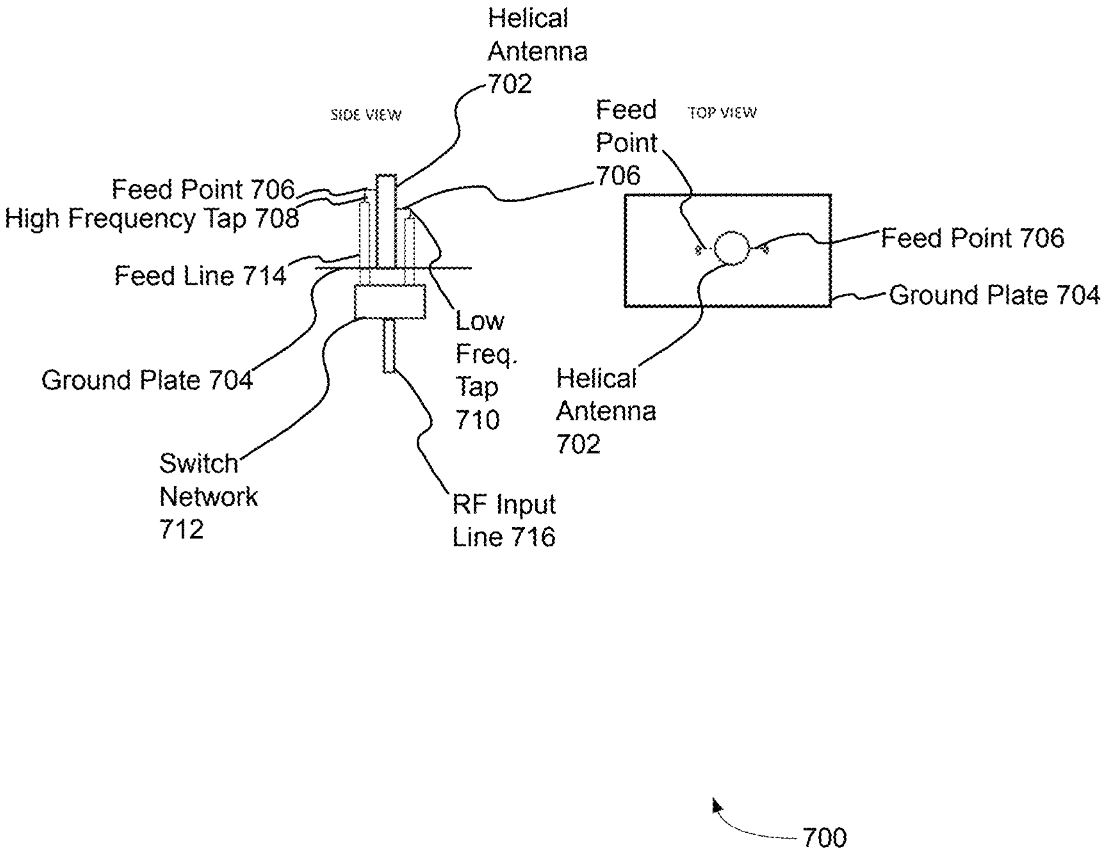
FIG. 7 shows an antenna structure diagram which supports techniques for maintaining resonance in single-frequency and multi-frequency SEW antennas in accordance with various aspects of the present disclosure.

FIG. 7 shows an antenna structure diagram 700 which supports techniques for maintaining resonance in single-frequency and multi-frequency SEW antennas in accordance with various aspects of the present disclosure. As depicted in FIG. 7, the antenna structure diagram 700 may include one or more of a helical antenna 702, a ground plate 704, feed points 706, a high frequency tap 708, a low frequency tap 710, a switch network 712, a feed line 714, and/or other components.

The helical antenna 702 may represent the primary radiating element of the antenna system. The helical antenna 702 may be designed to excite SEWs (e.g., plasmon/polariton charges) at an interface between materials with differing dielectric properties. The helical antenna 702 may be positioned in proximity to a conductive surface to couple with surface electromagnetic waves. In some implementations, the helical antenna 702 may be structured as a quarter wave resonant helix capable of supporting strong magnetic fields in its core. The helical antenna 702 may have a tip that is designed to enhance displacement currents for effective energy transfer.

The ground plate 704 may serve as a reference plane for the helical antenna 702. The ground plate 704 may be utilized to create a stable and predictable environment for the helical antenna 702 to operate. The ground plate 704 may be positioned relative to the helical antenna 702 to affect the impedance and radiation pattern of the antenna. In some implementations, the ground plate 704 may be optional, and alternative grounding methods may be employed depending on the specific application of the helical antenna 702.

The feed points 706 may provide connection interfaces for the transmission of electromagnetic signals to and from the helical antenna 702. The feed points 706 may be strategically located on the helical antenna 702 to match the impedance of the antenna to the transmission line. The feed points 706 may be adjusted to optimize the resonance of the helical antenna 702 at specific frequencies. In some implementations, the feed points 706 may be tapped at different points along the helical antenna 702 to enable multiband functionality.

The high frequency tap 708 may allow for the coupling of higher frequency signals with the helical antenna 702. The high frequency tap 708 may be positioned to resonate with the helical antenna 702 at a desired high frequency. The high frequency tap 708 may be isolated from lower frequency signals to maintain the integrity of the high frequency transmission. In some implementations, the high frequency tap 708 may be part of a multiband system that includes multiple tapping points for different frequency bands.

The low frequency tap 710 may enable the coupling of lower frequency signals with the helical antenna 702. The low frequency tap 710 may be located at a point on the helical antenna 702 where the impedance is suitable for low frequency operation. The low frequency tap 710 may be used in conjunction with the high frequency tap 708 to provide a broader range of frequency coverage. In some implementations, the low frequency tap 710 may be designed to operate when the high frequency tap 708 is open circuited, allowing for selective frequency band operation.

The switch network 712 may facilitate the selection between different feed points 706 for signal transmission. The switch network 712 may be configured to connect the feed line 714 to the appropriate feed point 706 based on the operating frequency. The switch network 712 may include electronic components that switch the active feed point while keeping other feed points at a high impedance. In some implementations, the switch network 712 may be controlled electronically to enable rapid switching between frequency bands.

The feed line 714 may carry electromagnetic signals to the helical antenna 702 from a signal source. The feed line 714 may be a coaxial cable that provides a path for the signals to reach the helical antenna 702. The feed line 714 may be matched to the impedance of the helical antenna 702 to ensure efficient power transfer. In some implementations, the feed line 714 may be integrated with the switch network 712 to streamline the signal routing process.

In some implementations, the helical antenna 702 may be vertically oriented with the ground plate 704 positioned horizontally at its base. The feed points 706 may be located at different heights along the helical antenna 702 to facilitate multiband operation. The high frequency tap 708 may be positioned near the top of the helical antenna 702, while the low frequency tap 710 may be located closer to the base.

The switch network 712 may be connected to the feed line 714 and may selectively route signals to the appropriate feed points 706 based on the desired operating frequency. The ground plate 704 may provide a stable reference for the helical antenna 702, and the feed line 714 may ensure efficient signal transmission to and from the antenna system.

Figure 8:
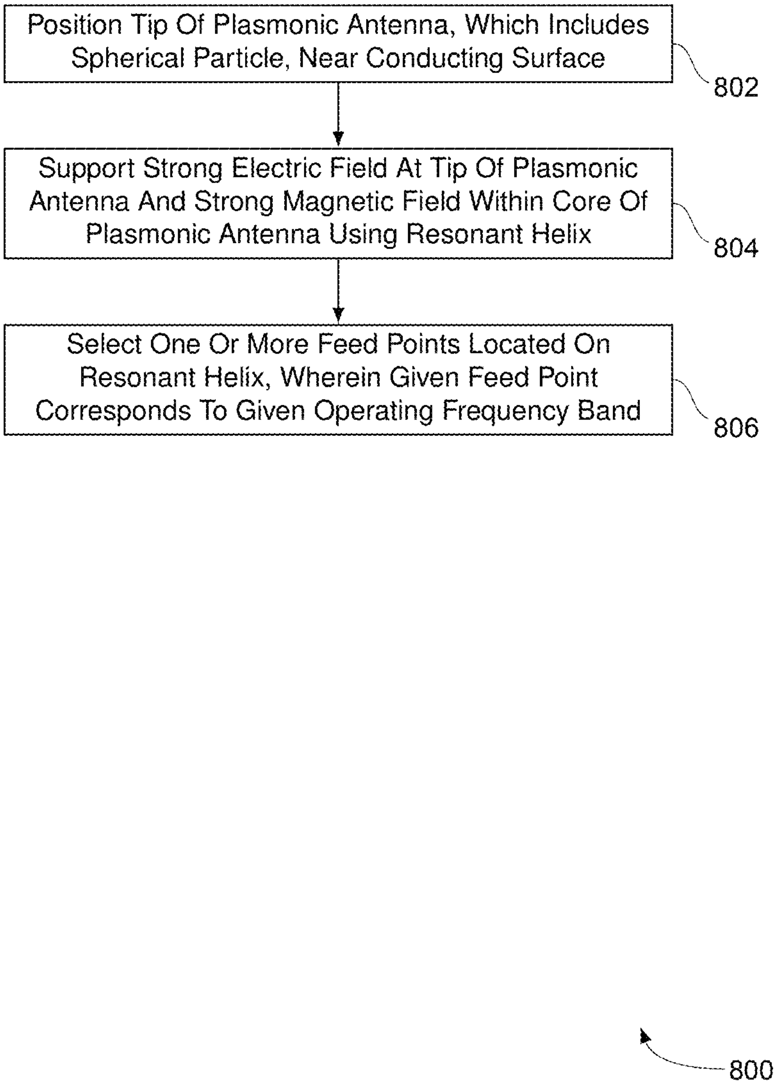
FIG. 8 shows a flowchart illustrating a method of using SEW antennas for maintaining resonance in single-frequency and multi-frequency SEW antennas in accordance with various aspects of the present disclosure.

FIG. 8 shows a flowchart illustrating a method 800 of using SEW antennas for maintaining resonance in single-frequency and multi-frequency SEW antennas in accordance with various aspects of the present disclosure.

At 802, the method 800 may include positioning a tip of the SEW antenna, which includes a spherical particle, near the conducting surface. The operations of 802 may be performed in accordance with examples as disclosed herein. In some examples, aspects of the operations of 802 may be performed by an SEW antenna tip 202, a metal surface 208, and/or other components as described with reference to FIG. 2.

At 804, the method 800 may include supporting a strong electric field at the tip of the SEW antenna and a strong magnetic field within a core of the SEW antenna using a resonant helix. The operations of 804 may be performed in accordance with examples as disclosed herein. In some examples, aspects of the operations of 804 may be performed by a resonant helix 204, one or more feed points 206, and/or other components as described with reference to FIGS. 4 and 6.

At 806, the method 800 may include selecting one or more feed points located on the resonant helix, wherein a given feed point corresponds to a given operating frequency band. The operations of 806 may be performed in accordance with examples as disclosed herein. In some examples, aspects of the operations of 806 may be performed by one or more feed points 206, a resonant helix 204, a feed coaxial line 210, and/or other components as described with reference to FIG. 2 and FIG. 7.

It should be noted that the methods described herein describe possible implementations, and that the operations and the steps may be rearranged or otherwise modified and that other implementations are possible. Furthermore, aspects from two or more of the methods may be combined.

Aspect 1: A surface electromagnetic wave (SEW) antenna, comprising: a tip of the SEW antenna, the tip including a spherical particle configured for maintaining resonance frequency in response to proximity to a conducting surface; a resonant helix supporting a strong electric field at the tip of the SEW antenna and a strong magnetic field within a core of the SEW antenna; and one or more feed points located on the resonant helix, a given feed point corresponding to a given operating frequency band.

Aspect 2: The SEW antenna of aspect 1, further comprising a ground plate positioned adjacent to the resonant helix, the ground plate configured to facilitate impedance matching between the SEW antenna and the conductive surface.

Aspect 3: The SEW antenna of any of aspects 1 through 2, wherein the spherical particle at the antenna tip configuration is composed of a conductive material that is the same as or different from the material of the conductive surface in response to which the resonance frequency is maintained.

Aspect 4: The SEW antenna of any of aspects 1 through 3, further comprising a feed coax line connected to the given feed point, the feed coax line being configured to transmit electromagnetic energy to the resonant helix without substantial reflection.

Aspect 5: The SEW antenna of any of aspects 1 through 4, further comprising a switch network operatively connected to the one or more feed points, the switch network configured to selectively activate a high-frequency tap or a low-frequency tap for a desired operating frequency band.

Aspect 6: The SEW antenna of any of aspects 1 through 5, wherein the resonant helix is oriented in a side view configuration such that the axis of the helical antenna is parallel to the conducting surface.

Aspect 7: The SEW antenna of any of aspects 1 through 6, wherein the antenna structure is filled with a dielectric material to maintain the resonance frequency in response to variations in the proximity to the metal surface.

Aspect 8: The SEW antenna of any of aspects 1 through 7, wherein the antenna feed point is adjustable along the resonant helix to enable tuning of the operating frequency band in response to changes in the surrounding environment.

Aspect 9: The SEW antenna of any of aspects 1 through 8, wherein the resonant helix is encapsulated in a protective coating to prevent direct contact with the metal surface while maintaining capacitive coupling.

Aspect 10: The SEW antenna of any of aspects 1 through 9, wherein the spherical particle is dimensioned to optimize the capacitive coupling with the metal surface for different metal surface types.

Aspect 11: The SEW antenna of any of aspects 1 through 10, wherein the feed line is integrated within the structure of the resonant helix to minimize interference and maintain signal integrity.

Aspect 12: The SEW antenna of any of aspects 1 through 11, wherein the switch network includes a plurality of electronically controlled relays to facilitate rapid switching between the high frequency tap and the low frequency tap.

Aspect 13: The SEW antenna of any of aspects 1 through 12, wherein the antenna tip configuration includes a plurality of spherical particles, each spherical particle corresponding to a different operating frequency band.

Aspect 14: The SEW antenna of any of aspects 1 through 13, wherein the resonant helix comprises a material with low loss and high magnetic permeability to enhance the magnetic field within its core in response to electromagnetic energy from the feed coax line.

Aspect 15: The SEW antenna of any of aspects 1 through 14, wherein the spherical particle at the antenna tip is coated with a dielectric layer to maintain capacitive coupling in response to environmental contaminants on the conductive surface.

Aspect 16: The SEW antenna of any of aspects 1 through 15, wherein the resonant helix is configured to shrink or extend in response to a mechanical action to adjust the operating frequency band.

Aspect 17: The SEW antenna of any of aspects 1 through 16, wherein the resonant helix includes a plurality of segments, each segment corresponding to a different operating frequency band and selectively connectable to the feed coax line.

Aspect 18: The SEW antenna of any of aspects 1 through 17, wherein the spherical particle is replaceable with particles of varying sizes to adjust the resonance frequency in response to different conductive surface types.

Aspect 19: The SEW antenna of any of aspects 1 through 18, wherein the resonant helix is configured with a variable pitch to enable fine-tuning of the operating frequency band in response to an impedance analyzer's readings.

Aspect 20: A method for maintaining resonance frequency of an SEW antenna in response to proximity to a conducting surface, the method comprising: positioning a tip of the SEW antenna, which includes a spherical particle, near the conducting surface; supporting a strong electric field at the tip of the SEW antenna and a strong magnetic field within a core of the SEW antenna using a resonant helix; and selecting one or more feed points located on the resonant helix, wherein a given feed point corresponds to a given operating frequency band.

Aspect 21: The method of aspect 20, further comprising positioning a ground plate adjacent to the resonant helix, wherein the ground plate is configured to facilitate impedance matching between the SEW antenna and the conducting surface.

Aspect 22: The method of any of aspects 20 through 21, wherein the spherical particle at the tip of the SEW antenna is composed of a conductive material that is the same as or different from the material of the conducting surface in response to which the resonance frequency is maintained.

Aspect 23: The method of any of aspects 20 through 22, further comprising connecting a feed coax line to the given feed point, wherein the feed coax line is configured to transmit electromagnetic energy to the resonant helix without substantial reflection.

Aspect 24: The method of any of aspects 20 through 23, further comprising operatively connecting a switch network to the one or more feed points, wherein the switch network is configured to selectively activate a high-frequency tap or a low-frequency tap for a desired operating frequency band.

Aspect 25: The method of any of aspects 20 through 24, wherein the resonant helix is oriented such that the axis of the helical antenna is parallel to the conducting surface in a side view configuration.

Aspect 26: The method of any of aspects 20 through 25, further comprising filling the antenna structure with a dielectric material to maintain the resonance frequency in response to variations in the proximity to the conducting surface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A surface electromagnetic wave (SEW) antenna system, comprising:

- a tip positioned at an end of a SEW antenna, the tip including a spherical particle configured for maintaining resonance frequency in response to proximity of the tip to a conducting surface;
- a resonant helix supporting a strong electric field at the tip of the SEW antenna and a strong magnetic field within a core of the SEW antenna, wherein the resonant helix is encapsulated in a protective coating to prevent direct contact with the conducting surface while maintaining capacitive coupling;
- one or more feed points located on the resonant helix, a given feed point corresponding to a given operating frequency band; and
- a switch network operatively connected to the one or more feed points, the switch network configured to selectively activate a high-frequency tap or a low-frequency tap for a desired operating frequency band.

2. The SEW antenna system of claim 1, further comprising a ground plate positioned adjacent to the resonant helix, the ground plate configured to facilitate impedance matching between the SEW antenna and the conducting surface.

3. The SEW antenna system of claim 1, wherein the spherical particle at the tip of the SEW antenna is composed of a conductive material that is the same as or different from the material of the conducting surface in response to which the resonance frequency is maintained.

4. The SEW antenna system of claim 1, further comprising a feed coax line connected to the given feed point, the feed coax line being configured to transmit electromagnetic energy to the resonant helix without substantial reflection.

5. The SEW antenna system of claim 1, wherein the resonant helix is oriented in a side view configuration such that an axis of the SEW antenna is parallel to the conducting surface.

6. The SEW antenna system of claim 1, wherein the SEW antenna is filled with a dielectric material to maintain the resonance frequency in response to variations in the proximity to the conducting surface.

7. The SEW antenna system of claim 1, wherein the antenna feed point is adjustable along the resonant helix to enable tuning of the operating frequency band in response to changes in the surrounding environment.

8. The SEW antenna system of claim 1, wherein the spherical particle is dimensioned to optimize the capacitive coupling with the conducting surface for different surface types.

9. The SEW antenna system of claim 1, wherein the feed line is integrated within the structure of the resonant helix to minimize interference and maintain signal integrity.

10. The SEW antenna system of claim 1, wherein the switch network includes a plurality of electronically controlled relays to facilitate rapid switching between the high frequency tap and the low frequency tap.

11. The SEW antenna system of claim 1, wherein the tip includes a plurality of spherical particles, each spherical particle corresponding to a different operating frequency band.

12. The SEW antenna system of claim 1, wherein the conducting surface is external to the SEW antenna system.

13. The SEW antenna system of claim 1, wherein the conducting surface is a conductive interface between media having different dielectric properties.

14. The SEW antenna system of claim 1, wherein the conducting surface is a conductive interface between media having different conductive properties.

15. A method for maintaining resonance frequency of a surface electromagnetic wave (SEW) antenna in response to proximity to a conducting surface, the method comprising:

- positioning a tip of the SEW antenna, which includes a spherical particle, near the conducting surface;
- supporting a strong electric field at the tip of the SEW antenna and a strong magnetic field within a core of the SEW antenna using a resonant helix, wherein the resonant helix is encapsulated in a protective coating to prevent direct contact with the conducting surface while maintaining capacitive coupling;
- selecting one or more feed points located on the resonant helix, wherein a given feed point corresponds to a given operating frequency band; and
- operatively connecting a switch network to the one or more feed points, wherein the switch network selectively activates a high-frequency tap or a low-frequency tap for a desired operating frequency band.

16. The method of claim 15, further comprising positioning a ground plate adjacent to the resonant helix, wherein the ground plate is configured to facilitate impedance matching between the SEW antenna and conducting surfaces and interfaces.

17. The method of claim 15, wherein the spherical particle at the tip of the SEW antenna is composed of a conductive material that is the same as or different from the material of the conducting surface in response to which the resonance frequency is maintained.

18. The method of claim 15, further comprising connecting a feed coax line to the given feed point, wherein the feed coax line is configured to transmit electromagnetic energy to the resonant helix without substantial reflection.

19. The method of claim 15, wherein the resonant helix is oriented such that an axis of the SEW antenna is parallel to the conducting surface in a side view configuration.

20. The method of claim 15, further comprising filling the SEW antenna with a dielectric material or high permittivity magnetic material to maintain the resonance frequency in response to variations in the proximity to the conducting surface.

* * * * *